Patented Sept. 16, 1941

2,256,441

UNITED STATES PATENT OFFICE 2,256,441

MINERAL OIL COMPOSITION AND IMPROVING AGENT THEREFOR

Orland M. Reiff, Woodbury, N. J., assignor to Socony-Vacuum Oil Company, Incorporated, New York, N. Y., a corporation of New York No Drawing. Application March 8, 1940, Serial No. 322,969

34 Claims. (Cl. 252—35)

This invention has to do in a general way with mineral oil compositions and is more particularly related to mineral oil compositions of the lubricant type to which an agent has been added for the purpose of improving the oil in certain respects. It is an object of this invention to provide a novel class of mineral oil addition agents which will improve one or more important properties of a mineral oil fraction. It is a further object to provide mineral oil compositions containing such improving agents.

In my copending application Serial No. 222,755, filed August 3, 1938, Patent No. 2,197,837, issued April 23, 1940, of which this application is a continuation in part, I have described a general class of "metallo-wax-aryl" compounds as mineral oil addition agents which are multifunctional in that they are effective to reduce the pour point, improve the viscosity index, and retard the deleterious effects of oxidation in the oil to which they are added. The present invention is predicated upon the discovery that the sulfur derivatives, or more specifically, the sulfides (monosulfides and polysulfides) of metalorganic compounds of the type disclosed in the aforesaid application are improved in certain respects over the corresponding metalorganic compound.

More specifically, the present invention is directed to the oil-miscible sulfides (mono- and poly-sulfides and polymers thereof) of the metal salts of alkyl-substituted hydroxyaromatic carboxylic acids as mineral oil-improving agents, mineral oil-miscibility being obtained by the alkyl substituent on the aryl nucleus. The oil-miscible metal salts of hydroxyaromatic carboxylic acids, corresponding to the sulfides contemplated herein, are disclosed in my copending application Serial No. 206,682, filed May 7, 1938, and in copending application Serial No. 210,160, filed May 26, 1938, in which I am a coinventor.

The addition agents of the present invention are, like those of the last-mentioned copending applications, characterized by the presence of an hydroxyaromatic nucleus containing a carboxyl group, the hydrogen of the carboxyl group or both the hydroxyl and carboxyl hydrogens being substituted with metal. Also, as in the salts of the aforesaid copending applications, the present addition agents are characterized by the substitution of at least one nuclear hydrogen atom on the aromatic nucleus with an oil-solubilizing substituent. This solubilizing substituent is preferably an alkyl group.

The addition agents of the present invention are distinguished from those of the aforesaid copending applications in that the present addition agents are condensation products wherein two or more of the characterizing nuclear groups may be considered as having been interconnected through a linkage (or linkages) comprised of an element from the group consisting of sulfur, selenium, or tellurium, preference being given to sulfur. Through the introduction of sulfur, for example, in the manner or manners to be hereinafter described, I obtain what may be broadly termed a sulfide of an alkyl-substituted hydroxyaromatic carboxylic acid salt. This general terminology is inclusive of sulfides of alkylated hydroxyaromatic acid salts in which only the carboxyl hydrogen is substituted with its equivalent weight of metal and in which both the hydroxyl and carboxyl hydrogens are substituted with metal. This general class of sulfides of metal salts distinguishes over the corresponding general class of metal salts disclosed in the aforesaid copending applications in that they have increased effectiveness in retarding the deleterious effects of oxidation in the oil. In the preferred multifunctional class of sulfides I have found such sulfides to possess increased pour depressant and viscosity index improving properties as well as improved antioxidant properties over the corresponding salts of the aforesaid applications. The improved antioxidant properties are particularly significant in retarding the development of acidity in certain types of oils and under certain conditions of use.

The sulfides of alkyl-substituted hydroxyaromatic carboxylic acid metal salts contemplated herein are, as aforesaid, condensation products and may be characterized by the general formula I 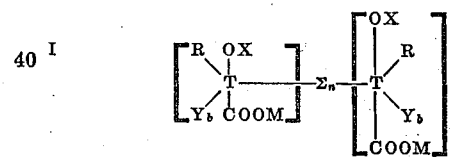

in which T represents a mono- or poly-cyclic aromatic nucleus; Σ represents sulfur, selenium, or tellurium; and $n$ represents a whole number from one to four. R represents the oil-solubilizing group, preferably (for multifunctional properties) at least one alkyl group having at least 20 carbon atoms; $Y_b$ represents residual hydrogen or a substituent or additive group in the aryl nucleus T, as will be hereinafter more fully described; and X represents hydrogen or the hydrogen equivalent of a metal; and M represents the hydrogen equivalent of a metal.

For the preferred multifunctional oil-improving agents R represents at least one alkyl group corresponding to a relatively high molecular weight aliphatic hydrocarbon (herein referred to as a heavy alkyl group). This group (R) should, for the desired multifunctional oil-improving property, be at least one alkyl group containing at least twenty carbon atoms, and, as will hereinafter appear, may preferably be derived from a predominantly aliphatic hydrocarbon material of the character of petroleum wax.

In addition to the oil-solubilizing alkyl group (R), the aryl nucleus may contain residual hydrogen, a part or all of which may, in turn, be substituted with other substituents which may have positive, or negative, or neutral oil-solubilizing effect. The character Y of the foregoing general formula, therefore, represents additive hydrogen as can be obtained by hydrogenation, residual nuclear hydrogen, or a radical selected from the group consisting of hydroxyl, ester, keto, alkoxy, aroxy, ether alcohol, aldehyde, oxime, amide, carbamide, aralkyl, aryl, alkaryl, halogen, nitroso, amino, nitrosamine, amidine, imine, N-thio, diazo, hydrazine, cyano, azoxy, azo and hydrazo radicals, and $b$ represents the number of Y substituents and is equal to zero or a whole number corresponding to the number of available hydrogens not substituted with OX, COOM, $\Sigma_n$, and R.

In general, it appears that any metal may be employed as the metal M (or X when X is a metal) in compounds or condensation products of the aforesaid type to provide valuable oil addition agents. The metals contemplated herein may be broadly classified as metals of groups I to VIII inclusive of the periodic system capable of forming carboxylate salts. These metals comprise the following: the alkali metals: lithium, sodium, potassium, rubidium, and caesium; the alkaline earth group: beryllium, magnesium, calcium, strontium, and barium; the metals zinc, cadmium, mercury, scandium; the metals aluminum, gallium, indium, thallium, titanium, zirconium, cerium, thorium; germanium, tin, and lead; vanadium, columbium, and tantalum; arsenic, antimony, and bismuth; chromium, molybdenum, tungsten, and uranium; rhenium, manganese, iron, cobalt, and nickel; ruthenium, rhodium, and palladium; osmium, iridium, and platinum.

Some of the rare earth metals are given in the foregoing. Other rare earth metals suitable for use in the metal carboxylate (COOM) group (and the oxy-metal (OX) group when X is metal) of the sulfides of alkylated hydroxy-aromatic carboxylic acid salts contemplated herein are those now commercially available as the cerium and yttrium group: namely, a mixture of praseodymium, neodymium, samarium, europium, gadolinium, terbium, dypsprosium, holmium, erbium, thallium and lutecium.

The selection of a metal will, of course, depend to a certain extent upon the character of the oil in which the addition agent is to be added and the conditions under which it is to be used. Certain metals such as lead, zinc, and tin, for example, may contribute to the oiliness characteristics of the oil. The alkali metals are not so desirable where the oil is to be used in the presence of water because of the tendency of the addition agents containing same to cause emulsification. A preferred group of metals, the sulfide salts of which have been prepared and tested for use in lubricating oils, is comprised of tin, aluminum, zinc, chromium, and cobalt, with special preference given to tin for use in crankcase lubricants of the type used in automotive engines.

As aforesaid, the aryl nucleus T may be mono- or poly-cyclic, corresponding, for example, to phenol, naphthol, or anthrol and their derivatives. A preferred condensation product derived from alkyl-substituted phenol (hydroxyphenyl) carboxylic acid may, in its simplest form, be represented by the general formula II. 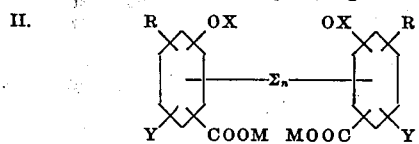

Since the condensation reaction employed in synthesizing the sulfides contemplated herein may be attended by a certain amount of further condensation, such further condensed compounds, hereinafter called polymers, are included herein within the terms sulfides, etc., and as coming within the general Formula I above. Polymers of this character which may be associated with or formed instead of the simple condensation compound of Formula II may be represented by the following formula:

III. 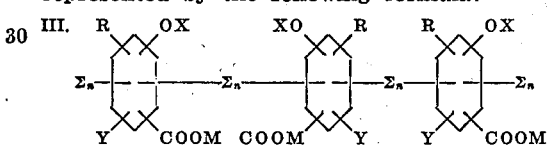

Also, where alkylation of the aryl nucleus has been effected to obtain a multifunctional product by a preferred procedure which involves the Friedel-Crafts condensation of a phenol with a halogenated aliphatic hydrocarbon material of at least twenty carbon atoms, such condensation may result in the formation of compounds in which two or more phenol groups are interconnected by one or more aliphatic hydrocarbon chains. Compounds of this type, when further reacted to obtain the sulfides of phenol carboxylic acid salts, may result in the formation of compounds corresponding to the formula IV. 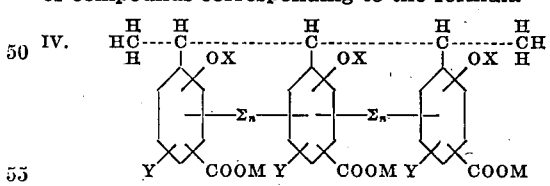

or compounds of the formula

V. 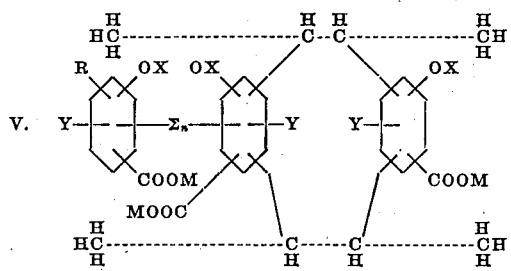

in which the chains represent the aliphatic hydrocarbon group R of general formula I.

The foregoing discussion is not contemplated as a development of the specific molecular composition or structure of the compound or condensation products constituting the mineral oil addition agents contemplated herein but is intended to be indicative of the possible composition of such addition agents. These addition agents may be broadly characterized as the sulfides (or the corresponding selenides or tellurides) of alkylated hydroxyaromatic carboxylic acid salts and for purposes of definition and description herein are characterized by general formula I above, which is inclusive of such sulfides, selenides, and tellurides in their simplest form as well as the nuclear group which characterizes the more complex molecular possibilities. Thus, the addition agents contemplated herein may be characterized as condensation products or compounds which possess at least once the grouping identified above as general formula I. As aforesaid, the term "sulfide," as used herein, is inclusive of the monosulfides, disulfides, trisulfides, tetrasulfides, etc.—that is, it includes both monosulfides and polysulfides—and is also intended to include such polymers and related derivatives as may be formed by the hereinafter-described procedures employed to illustrate the synthesis of the addition agents contemplated by this invention. It is pointed out that the sulfur derivatives or sulfides of alkylated hydroxyaromatic carboxylic acid salts are the preferred class of addition agents contemplated herein. For that reason the invention is specifically described with reference to the sulfides, but it is to be understood that the corresponding selenides and tellurides are contemplated by and come within the scope of the broad inventive concept.

One general procedure for synthesizing the mono- and poly-sulfides of alkyl-substituted hydroxyaromatic carboxylic acid salts of the type contemplated herein involves the reaction of the corresponding alkylated hydroxyaromatic acid with sulfur or sulfur halides, followed by substitution of the carboxyl hydrogen or both the hydroxyl and carboxyl hydrogen with the desired metal. Another procedure involves the use of an alkali metal salt of the hydroxyaromatic acid (preferably an alkali metal phenate-alkali metal carboxylate) instead of the corresponding acid, which results in the formation of the corresponding sulfide of a hydroxyaromatic alkali carboxylate. This, then, can be converted to the salt of the desired metal in which only the carboxyl hydrogen is metal-substituted or in which both the hydroxyl and carboxyl hydrogens are metal-substituted by procedures to be hereinafter described.

In the event sulfur dichloride ($SCl_2$) is used in the general procedure described above, the condensation product will be in the nature of a monosulfide (or polymer thereof); sulfur monochloride ($S_2Cl_2$) will yield the corresponding disulfide (or polymer thereof) and, of course, a mixture of sulfur halides may be employed to yield a mixture of monosulfides and disulfides. Elementary sulfur may be employed as the condensation reagent, but this is not considered the most desirable procedure.

Sulfur derivatives of higher sulfur content may be obtained by reacting a compound or condensation product having a disulfide linkage (obtained with sulfur monochloride) with elementary sulfur or with alkali polysulfides or with an alkyl tetrasulfide. Such higher sulfur derivatives may also be obtained by first reducing the disulfide to form a thio-phenol of the alkylated hydroxyaromatic acid and then reacting the thio-phenol with sulfur dichloride (to form the trisulfide) or sulfur monochloride (to form the tetrasulfide) of the alkylated hydroxyaromatic carboxylic acid, which can then be converted to a polysulfide of a salt of the desired metal.

The alkylated hydroxyaromatic carboxylic acid (or alkali metal salt thereof) used in preparing the sulfides may be obtained in various ways. For example, a hydroxyaromatic compound such as phenol or naphthol may first be alkylated to substitute part of the nuclear hydrogen with an alkyl group or groups of sufficient size to impart oil-miscibility to the ultimate product. The alkylated hydroxyaromatic compound may then be converted to the corresponding hydroxyaromatic carboxylic acid by a suitable carboxylation procedure. For example, the alkylated hydroxyaromatic compound may be subjected to the Kolbe synthesis described in detail in my aforesaid copending applications Serial Nos. 210,160 and 206,682 to form an alkali metal carboxylate salt of the alkylated hydroxyaromatic acid. This salt may be neutralized to form the corresponding acid, or it may be converted to the alkali phenate-alkali carboxylate derivative by reacting with an alkali metal or alkali alcoholate to substitute the hydroxyl hydrogen with alkali metal.

The alkylation of the hydroxyaromatic compound may be carried out in various ways. A preferred procedure is to subject a hydroxyaromatic compound or an oxyaromatic compound to a Friedal-Crafts condensation reaction with a halogenated aliphatic hydrocarbon, which for obtaining the preferred multifunctional addition agents should be an aliphatic hydrocarbon containing at least twenty carbon atoms. This alkylation may also be carried out with unsaturated hydrocarbons or aliphatic alcohols, using so-called cationoid agents such as $H_2SO_4$ and anhydrous aluminum chloride as catalysts. For obtaining the preferred multifunctional addition agents with unsaturated hydrocarbons or aliphatic alcohols they should be high molecular weight compounds containing at least twenty carbon atoms such, for example, as eicosylene, cerotene, melene, polymerized isobutylene, etc., and myricyl alcohol, ceryl alcohol, etc. As an alternative procedure for the utilization of high molecular weight alcohols as alkylating agents, the primary alcohols can be converted to the corresponding alkyl halide and condensed like chlorwaxes with the hydroxyaromatic compounds by the Friedel-Crafts reaction.

The Friedel-Crafts synthesis is preferred for obtaining the alkylated hydroxyaromatic compound, and as a source for the alkyl substituent preference is given to high molecular weight hydrocarbons typified by those which characterize the heavier products of petroleum, such as heavy petroleum oils of the lubricant type, petrolatum and crystalline petroleum wax or other compounds which will result in relatively long chain aliphatic substituents. Special preference is given to petroleum wax of melting point not substantially less than about 120° F. which is predominantly comprised of aliphatic hydrocarbons having a molecular weight of at least 350 and containing at least twenty carbon atoms. It is to be understood, therefore, that while this invention contemplates the use of pure aliphatic hydrocarbons or halogenated aliphatic hydrocarbons as alkylating agents, a mixture of such compounds is for practical reasons considered preferable, and for that reason mixed compounds or condensation products are included herein under the general language employed in describing and defining the invention.

Hydroxyaromatic compounds which may be used in the alkylation reaction are mono- or polycyclic and mono- or polyhydric hydroxyaromatic compounds which may or may not be otherwise substituted, as hereinafter indicated. Specific examples of compounds which may be used in this reaction are: phenol, resorcinol, hydroquinone, catechol, cresol, xylenol, hydroxydiphenyl, benzylphenol, phenylethyl phenol, phenol resins, methylhydroxydiphenyl, alpha and beta naphthol, xylyl naphthol, benzyl naphthol, anthranol, phenylmethyl naphthol, phenanthrol, anisole, beta naphthyl methyl ether, chlorphenol, and the like. Preference in general is to the monohydroxy phenols otherwise unsubstituted, particular preference being given to phenol and alpha and beta naphthol. Mixed alkyl-aryl and aralkyl-aryl ethers such as anisole and beta-naphthylmethyl ether are given as examples because the Friedel-Crafts reaction with these ethers is accompanied by some rearrangement, yielding free hydroxyl groups.

Where it is desired to obtain a compound or condensation product in which the aryl nucleus contains in addition to, or instead of, residual hydrogen, a substituent of the type classified in general formula I as $Y_b$, it is pointed out that with the exception of substituents such as aralkyl, aryl, alkaryl, halogen, hydroxyl, and aroxy, such Y groups are introduced after alkylating and carboxylating the hydroxyaromatic compound. I have discovered that the well-known methods for introducing the different $Y_b$ radicals into benzene and its simpler derivatives of relatively low molecular weight can also be used to introduce these substituents into the aryl nuclei of the more complex compounds or condensation products contemplated by this invention as oil-improving agents.

It should also be pointed out that where nuclear substituents are present containing methylene groups such as alkyl, keto, ether, ester radicals, etc., the same may also carry substituents such as halogen, hydroxyl, amino, cyano, nitro, xanthate, and mercapto groups. The methods for introducing these substituents are also well known to those skilled in the art.

To illustrate the procedure which may be followed in preparing the addition agents contemplated by this invention, I shall now describe the general procedure which may be followed in synthesizing the monosulfide and the disulfide of the metal salts of wax-phenolic acid, after which I shall give specific examples further illustrating details in preferred procedures. The procedure to be followed in preparing other metal derivatives, other polysulfides and condensation products containing other alkyl substituents than those derived from petroleum wax and other aryl nuclei than that characterizing phenol will be obvious from the following description in the light of the foregoing. As aforesaid, condensation products characterized by at least one "wax" substituent (or other equivalent high molecular weight alkyl group) in the aryl nucleus constitute a preferred class because of their multifunctional properties, but the present invention is not limited thereto and includes sulfides of hydroxyaromatic acid salts having a low alkyl solubilizing substituents such as are typified by the metal salts derived from diamyl phenolic acid disulfide.

ALKYLATION OF PHENOL

A paraffin wax melting at approximately 120° F. and predominantly comprised of compounds having at least 20 carbon atoms in their molecules is heated to about 200° F., after which chlorine is bubbled therethrough until the wax has absorbed about 16 per cent of chlorine, such product having an average composition between a monochlorwax and a dichlorwax. Chlorwax of lower chlorine content can be used, but when the amount of chlorine absorbed is less than 10 per cent, it is desirable to separate the unreacted wax before or after the mixture is condensed with the hydroxyaromatic compound by the Friedel-Crafts reaction. Unreacted wax can be separated from chlorwax by well-known dewaxing methods. Unreacted wax can be separated after condensation with the hydroxyaromatic compound by solvent-dewaxing or by distillation with superheated steam or by vacuum-distillation. A quantity of a chlorwax containing 3 atomic proportions of chlorine is heated to a temperature varying from just above its melting point to not over 150° F., and 1 mol of phenol (hydroxybenzene) is admixed therewith. The mixture is heated to about 150° F., and a quantity of anhydrous aluminum chloride corresponding to about 3 per cent of the weight of the chlorwax in the mixture is slowly added with active stirring. The rate of addition of the aluminum chloride should be sufficiently slow to avoid violent foaming, and during such addition the temperature is preferably held at about 150° F. After the aluminum chloride has been added, the temperature of the mixture may be increased slowly to control the evolution of HCl gas to a temperature of about 350° F. If the emission of HCl gas has not ceased when the final temperature is reached, the mixture may be held at 350° F. for a short time to allow completion of the reaction, but to avoid possible cracking of the wax the mixture should not be heated appreciably above 350° F., nor should it be held at that temperature for any extended length of time. A suitable procedure consists in heating the mixture to a maximum temperature of 300° F. and holding at this point about three hours to complete the reaction, wherein appreciable cracking does not occur. Removal of non-alkylated material (phenol) can be effected generally by water-washing, but it is preferable to treat the water-washed product with super-heated steam, thereby insuring complete removal of the unreacted material and accomplishing the drying of the product in the same operation.

A wax-substituted phenol prepared according to the above procedure in which a quantity of chlorwax containing 3 atomic proportions of chlorine (16 per cent chlorine in the chlorwax) is reacted with 1 molecular proportion of phenol may for brevity herein be designated as "wax-phenol (3–16)." Parenthetical expressions of the type (A—B) will be used hereinafter in connection with the alkylated hydroxy-aromatic compounds to designate (A) the number of atomic proportions of chlorine in the chloraliphatic material reacted with one mol of hydroxyaromatic compound in the Friedel-Crafts reaction and (B) the chlorine content of the chloraliphatic material. In the above example $A=3$ and $B=16$. The same designation will also apply to the sulfides of the wax-substituted hydroxyaromatic carboxylic acid salts which constitute the ultimate product derived from the wax-phenol.

CARBOXYLATION OF WAX-PHENOL

In forming the carboxylic acid or the alkali metal carboxylate of a wax-phenol of the type obtained by the procedure described above, a preferred method involves, first, the substitution of the phenolic hydrogen with alkali metal, followed by carboxylation with $CO_2$ gas. The formation of a wax-alkali metal phenate, for example, may be carried out by using 500 parts by weight of wax-phenol obtained according to the foregoing procedure and 16 parts by weight of metallic sodium (or equivalent amount of metallic potassium). The reaction mixture is heated at about 500° F. during a two-hour period with rapid stirring to produce finely divided alkali metal and thereby accelerate the reaction. Wax-substituted alkali metal phenate may also be prepared by reacting the wax-phenol with an alcoholate of the alkali metal such as sodium butylate. For this purpose anhydrous aliphatic alcohols are usually the most suitable; and as an example, 500 parts by weight of wax-phenol (3–16) was reacted with 16 parts by weight of sodium in the form of ethyl or butyl sodium oxide by heating the mixture to about 400° F. and allowing the alcohol to distill off. Because of the high viscosity of the phenate mixture it is desirable to dilute the wax-phenol initially with mineral oil, using, for example, 3 parts of mineral oil to 1 part of wax-phenol (3–16).

The wax-sodium phenate obtained according to the foregoing procedures is then carboxylated. This carboxylation may be carried out in various ways, one effective procedure being to heat the wax-sodium phenate to a temperature of about 400° F. and introduce $CO_2$. The pressure can be gradually raised to about 500 pounds per square inch to complete the reaction at this temperature during a 1-hour period; or $CO_2$ can be blown through the mixture at atmospheric pressure, whereby the carboxylation can be completed in about 10 hours, depending somewhat upon the rate of stirring of the mixture. The carboxylation is considered complete when the mixture has changed from a gelatinous to a fluid composition when cooled to room temperature. In case mineral oil diluent is not used, the wax-like phenate is changed to a resilient rubber-like composition when fully carboxylated.

The product of this step is the sodium carboxylate salt of wax-substituted phenol carboxylic acid (3–16); or in case the wax-phenol is diluted initially with mineral oil, it is a mineral oil solution of such salt.

This salt may be converted to the corresponding carboxylic acid by neutralization with a mineral acid, or it may be converted to a sodium phenate-sodium carboxylate salt by reacting with an amount of sodium alcoholate containing sodium equivalent to the hydroxyl hydrogen of the phenol carboxylate. Also, two equivalents of sodium can be used in the carboxylation reaction, in which event the sodium phenate-sodium carboxylate can be obtained directly.

FORMATION OF THE SULFIDES

In the event the product of the foregoing step is a wax-phenol carboxylic acid, the corresponding sulfides thereof may be obtained by dissolving the acid in a suitable solvent such as carbon disulfide, benzene, chlorbenzene, ethylene dichloride, Stoddard Solvent, or the like, and bringing the temperature of the solution up to about 100° F., which is followed by addition of a sulfur halide or mixture of sulfur halides during about a ½ hour period. The mixture may then be held at this temperature for about one hour to complete the formation of the sulfide derivative. Hydrogen chloride is evolved in the reaction, resulting in fixation of the sulfur in the aryl nucleus. As regards the temperature of the reaction, it is to be understood that the reaction can be carried out at various temperatures from room temperature up to the boiling point of the solvent, but it is preferable for obtaining light-colored products that the temperature be not too high. The addition of the sulfur halide is controlled so as to prevent over-heating of the mixture by its heat of reaction. The mixture is then water-washed to remove dissolved hydrochloric acid, and the free acid is converted to its corresponding alkali salt. Salts of other metals are obtained by metathesis of the alkali salt with a normal inorganic or fatty acid salt or oxy salt of the desired metal, carrying out the reaction in aqueous or non-aqueous medium.

Where the Kolbe synthesis has been employed as the carboxylation procedure, the wax-phenol carboxylic acid may conveniently be obtained, as aforesaid, in the form of the alkali metal phenate-alkali metal carboxylate. The sulfide derivatives can be obtained from the product by treating with sulfur halide without first liberating the free acid, and in this case free HCl is not evolved unless an amount of sulfur halide in excess of the sodium content is used, the HCl being converted to sodium chloride by reaction with the alkali compound. When the alkali salt of the acid is reacted in the manner just described, solvents such as carbon disulfide and ethylene dichloride must be replaced with solvents such as alcohol, benzene, or chlorbenzene to avoid side reactions with the alkali derivative.

To form the corresponding polyvalent metal carboxylate salts of the sulfides of wax-phenolic acid, the sodium salt obtained according to the procedures just outlined above is treated with one equivalent of an alcohol-soluble salt of the desired metal dissolved in an alcohol such as normal butyl alcohol. The mixture is then refluxed for about 1 hour or a sufficient period of time to complete the reaction. At this stage the compound or condensation product contains combined sodium and chlorine; and while such product is suitable for certain uses to which this invention is directed, it has a tendency to form water-emulsions when a mineral oil blend containing same is contacted with water. It is desirable, therefore, to remove the combined sodium and chlorine by water-washing. A suitable procedure for accomplishing this de-salting operation consists in treating the reaction mixture with about 10 parts of water in the presence of about 100 parts of butanol, refluxing the mixture, and stirring for about an hour to complete the separation of the sodium chloride from the chemical combination.

The butanol-and-water mixture is then distilled and the reaction mixture filtered, preferably through a suitable filter aid such as "Hyflo," to obtain the finished product.

The general procedure described above is further illustrated by the following specific examples:

EXAMPLE 1

*Preparation of stannous carboxylate of wax-phenolic acid disulfide (3–16)*

One hundred parts by weight of the sodium phenate-sodium carboxylate salt of wax-phenolic acid (3–16) in 300 parts by weight of mineral oil are diluted with 100 parts by weight of butanol and heated to a temperature of about 100° F. To this solution 9.8 parts by weight of sulfur monochloride ($S_2Cl_2$) is added at a rate sufficiently slow that the heat of reaction will not cause appreciable rise in temperature of the reaction mixture. To form the sulfide of the stannous carboxylate salt from the sulfide of the sodium carboxylate salt thus formed, 14 parts by weight of anhydrous stannous chloride in solution in about 50 parts by weight of butanol is added to the reaction mixture and the mixture heated to the reflux temperature of the butanol during about one hour or for a sufficient length of time to complete the reaction. The sulfide of the stannous carboxylate thus formed is then "desalted" (to remove sodium chloride) by first distilling off an amount of the alcohol such that about 100 parts by weight of alcohol (butanol) remain. About 10 parts by weight of water are then added with stirring at a temperature of about 200° F. for about 3 hours. This time will vary depending upon the rate of stirring, the size of the batch, etc. The alcohol and water is then distilled from the mixture, after which it is filtered through "Hyflo" or other suitable filter aid, followed by steam-treating at from 250° to 300° F. to remove all traces of butanol. A current of inert gas such as nitrogen is then passed through the mixture while it is cooling to remove the steam vapors and give as the finished product an approximately ¼ blend of the stannous carboxylate salt of wax-phenolic acid (3–16) in mineral oil.

The foregoing general procedure and Example 1 are directed primarily to the formation of sulfides of hydroxyaromatic carboxylic acid salts in which the carboxyl hydrogen only is substituted with its equivalent weight of metal. Compounds of this general character may be identified as metal carboxylate salts of wax- (or alkyl-) substituted hydroxyaromatic acid sulfides, the term sulfide, as aforesaid, being inclusive of monosulfides and polysulfides. The specific product obtained in Example 1 above, under this nomenclature, is identified as the stannous carboxylate salt of wax-phenolic acid disulfide (3–16). The corresponding monosulfide would be obtained by substituting sulfur dichloride for sulfur monochloride in the reaction. The corresponding naphthol derivative would be termed the stannous carboxylate salt of wax- (or alkyl-) substituted naphtholic acid monosulfide or disulfide, as the case may be. The general class of compounds falling within this subgeneric classification are characterized by having at least once the molecular structure of general formula I in which X is hydrogen, which structure may be represented by the general formula

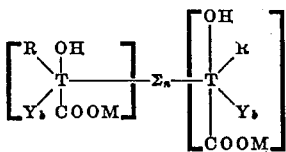

wherein the characters have the same significance defined above.

As aforesaid, this invention also contemplates as oil addition agents, compounds or condensation products of the foregoing type in which both the hydroxyl hydrogen and the carboxyl hydrogen are substituted with metals. These latter compounds, which may be generally termed metal phenate-metal carboxylate salts of hydroxyaromatic acid sulfides, are compounds or condensation products coming under general formula I in which X is metal instead of hydrogen. Compounds of this type may be characterized as condensation products which contain at least once the molecular grouping

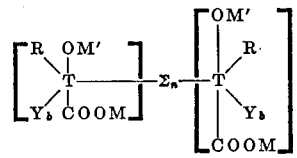

in which M' represents a metal which may be the same as or different from the metal M.

The "metal phenate-metal carboxylate" type of compounds or condensation products last referred to above may be obtained with slight modification in the procedure outlined for synthesizing the "metal carboxylate" salts. One important variation to be observed is that while, as aforesaid, the polyvalent metal carboxylate derivatives can be obtained by double decomposition from the alkali metal carboxylate derivative in either an aqueous or non-aqueous medium, the formation of the combined phenate-carboxylate salts of the polyvalent metals must be carried out in a non-aqueous medium. A suitable procedure for synthesizing the "metal phenate-metal carboxylate" type of compound, or, more specifically, the sulfides of alkylated hydroxyaromatic acid salts in which the hydroxyl hydrogen and the carboxyl hydrogen are substituted by their equivalent weight of metal, is illustrated by the following example.

EXAMPLE 2

The product from the Kolbe synthesis, comprising 100 parts by weight of the sodium phenate-sodium carboxylate salt of wax-phenolic acid (3–16) in 300 parts by weight of mineral oil distillate, is diluted with 100 parts by weight of butanol (or other suitable alcohol), and about 9.8 parts by weight of sulfur monochloride is added to the solution at a temperature in the neighborhood of 100° F. and at a rate sufficiently slow that the heat of reaction will not cause an appreciable rise in temperature. The reaction product in solution at this point may be considered as the sulfide (disulfide) of the sodium carboxylate salt of wax-phenolic acid. To this mixture is then added 28 parts by weight of anhydrous stannous chloride in solution in butanol (or other suitable solvent). The amount of stannous chloride is such that there is sufficient tin to satisfy both the hydroxyl and carboxyl groups of the phenolic acid derivative and, it will be observed, is twice the quantity used in Example 1. In order to substitute the hydroxyl group, which is free hydroxy, with the polyvalent metal it is necessary to have alkali metal present in the mixture equivalent in amount to the hydroxyl hydrogen. After adding the stannous chloride, therefore, I add about 3.36 parts by weight of sodium in the form of sodium butylate and heat the mixture to a temperature in the neighborhood of 250° F. and hold at that temperature for a time sufficient to complete the reaction. Removal of the sodium chloride, or de-salting, and purification can be effected in the same manner described in Example 1 above. The product of this reaction is the stannous phenate-stannous carboxylate salt of wax-phenolic acid disulfide (3–16). Modifications in the procedure necessary to obtain the corresponding salts of other polyvalent metals and other sulfides (mono- and poly-) will be obvious to those skilled in the art.

As an alternative procedure for carrying out the preparation of compounds represented by Example 1 above, the substitution of the sodium salt with tin may be carried out first, followed by reaction with sulfur halide. In the preparation of compounds represented by Example 2, one equivalent of tin may be first substituted, followed by sulfurization of the compound. The OH group is then substituted by the usual procedure of adding one equivalent of stannous chloride, followed by addition of one equivalent of sodium butylate and heating to 250° F. to complete the reaction. The de-salting and purification procedure is carried out as above.

Addition agents of the type obtained according to the foregoing procedures, in which the aryl nucleus is substituted with wax or other equivalent heavy alkyl group, may be admixed with mineral oil fractions in minor amounts from about 1/16 per cent to 5 per cent to obtain mineral oil blends of improved pour point and viscosity index, such oils being stabilized against those deleterious effects of oxidation which, for example, are manifested in an internal combustion engine by the formation of sludge, acid, and by the formation of "lacquer." These oil blends, therefore, have improved pour point and viscosity index and when used in internal combustion engines show marked decrease in the tendency to form acid and sludge and a further marked decrease in the tendency to cause piston ring-sticking and the filling of slots in the oil rings. As aforesaid, this invention also contemplates sulfides of alkylated hydroxyaromatic acid salts in which the alkyl substituent groups are derived from low molecular weight aliphatic hydrocarbons and impart oil-miscibility only to the product. This latter type of addition agent, while it is not effective to depress the pour point and improve the viscosity index of the oil, is an effective antioxidant. It is to be understood, of course, that the addition agents contemplated herein may be used in connection with other addition agents such as dyes, extreme pressure bases and the like.

To demonstrate the improved properties obtained in mineral oil blends containing addition agents of the type discussed herein, I have conducted several comparative tests with representative mineral oils alone and with the same oils blended with these improving agents, the results of such tests being discussed in the following examples.

EXAMPLE 3

Pour point depression

These tests were conducted with a motor oil having a Saybolt viscosity of 67 seconds at 210° F. and a pour point of +20° F. The pour points of blends formed from this oil and representative sulfides of wax-phenol carboxylic acid salts of various metals are listed in Table I below, from which it will be observed that the addition agents contemplated herein, when the aryl nucleus is substituted with wax, are highly effective pour point depressants.

TABLE I

| Addition agent | Conc. by wt. | A. S. T. M. pour point |
|---|---|---|
| | Percent | °F. |
| None | | +20 |
| Stannous carboxylate of wax-phenolic acid monosulfide (3–16) | 1/8 | −15 |
| Stannous carboxylate of wax-phenolic acid disulfide (3–16) | 1/8 | −15 |
| Stannous phenate-stannous carboxylate of wax-phenolic acid disulfide (3–16) | 1/8 | −15 |
| Aluminum carboxylate of wax-phenolic acid disulfide (3–16) | 1/8 | −15 |
| Aluminum phenate-aluminum carboxylate of wax-phenolic acid disulfide (3–16) | 1/8 | −15 |
| Zinc carboxylate of wax-phenolic acid disulfide (3–16) | 1/8 | −20 |
| Zinc phenate-zinc carboxylate of wax-phenolic acid disulfide (3–16) | 1/8 | −15 |
| Chromium carboxylate of wax-phenolic acid disulfide (3–16) | 1/8 | −10 |
| Chromium phenate-chromium carboxylate of wax-phenolic acid disulfide (3–16) | 1/4 | −10 |
| Cobaltous carboxylate of wax-phenolic acid disulfide (3–16) | 1/8 | −25 |
| Cobaltous phenate-cobaltous carboxylate of wax-phenolic acid disulfide (3–16) | 1/8 | −10 |
| None | | +20 |
| Nickelous carboxylate of wax-phenolic acid disulfide (3–16) | 1/8 | −15 |
| Nickelous phenate-nickelous carboxylate of wax-phenolic acid disulfide (3–16) | 1/8 | −15 |
| Molybdenum carboxylate of wax-phenolic acid disulfide (3–16) | 1/8 | −15 |
| Stannous carboxylate of wax-phenolic acid tetrasulfide (3–16) | 1/8 | −15 |
| Stannous phenate-stannous carboxylate of wax-phenolic acid tetrasulfide (3–16) | 1/8 | −15 |
| Stannous carboxylate of wax-naphtholic acid disulfide (3–15) | 1/8 | −5 |
| Stannous carboxylate-stannous naphtholate of wax-naphtholic acid disulfide (3–15) | 1/8 | −10 |

EXAMPLE 4

Viscosity index improvement

The data listed in Table II below showing the effectiveness of the addition agents contemplated herein for improving viscosity index (V. I.) were obtained in the conventional manner from the Saybolt viscosity of the oil and the oil blends at 100° F. and 210° F. The oil used was a viscous mineral oil of the lubricant type.

TABLE II

| Addition agent | Conc. by wt. | Say. visc. 100° F. | Say. visc. 210° F. | V. I. |
|---|---|---|---|---|
| | Percent | | | |
| None | | 140.7 | 41.8 | 79.3 |
| Stannous carboxylate of wax-phenolic acid monosulfide (3–16) | 1 | 159.8 | 42.9 | 84.3 |
| Stannous phenate-stannous carboxylate of wax-phenolic acid monosulfide (3–16) | 1 | 165.0 | 44.0 | 93.5 |
| Stannous carboxylate of wax-phenolic acid disulfide (3–16) | 1 | 155.9 | 43.0 | 86.8 |
| Stannous phenate-stannous carboxylate of wax-phenolic acid disulfide (3–16) | 1 | 150.6 | 43.1 | 96.5 |
| Zinc phenate-zinc carboxylate of wax-phenolic acid disulfide (3–16) | 1 | 156.2 | 43.2 | 90.2 |
| Chromium phenate-chromium carboxylate of wax-phenolic acid disulfide (3–16) | 1 | 163.6 | 43.8 | 92.6 |
| Cobaltous carboxylate of wax-phenolic acid disulfide (3–16) | 1 | 149.4 | 42.6 | 86.3 |
| Cobaltous phenate-cobaltous carboxylate of wax-phenolic acid disulfide (3–16) | 1 | 150.8 | 42.7 | 86.6 |
| Stannous carboxylate of wax-phenolic acid tetrasulfide (3–16) | 1 | 145.4 | 42.5 | 90.6 |
| Stannous phenate-stannous carboxylate of wax-phenolic acid tetrasulfide (3–16) | 1 | 142.3 | 42.2 | 88.0 |
| Stannous carboxylate of wax-alpha-naphtholic acid disulfide (3–15) | 1 | 147.7 | 42.8 | 94.2 |
| Stannous naphtholate-stannous carboxylate of wax-alpha naphtholic acid disulfide (3–15) | 1 | 148.7 | 42.9 | 98.9 |

EXAMPLE 5

Operation test

In addition to the foregoing tests I have also made comparative tests between an oil and an oil blend containing representative improving agents of the type contemplated herein to determine the comparative behavior of the unblended oil and the improved oil under actual operating conditions. The test was carried out in a single cylinder C. F. R. engine operated continuously over a time interval of 28 hours with the cooling medium held at a temperature of about 390° F. and the oil temperature held at about 150° F. The engine was operated at a speed of 1200 R. P. M.

The oil used in the test was a lubricating oil stock of 120 seconds Saybolt viscosity at 210° F., and the conditions observed were:

(a) The extent to which the piston rings were stuck;
(b) The extent to which the slots in the oil rings were filled with deposit;
(c) The amount of carbonaceous deposits in the oil; and
(d) The neutralization number or acidity (N. N.) of the oil.

The results obtained in this test are set forth in Table III below.

In making the test runs from which the data in Table III were obtained, comparative tests were made with a blank oil sample and a sample containing the addition agent in each instance. The blank oil samples are indicated by A1, A2, etc., and the blends containing addition agents are indicated by B1, B2, etc. The addition agents and percentage concentration thereof in the various blends are listed below.

B1 = ½% cobaltous carboxylate salt of wax-phenolic acid disulfide (3–16)
B2 = ½% cobaltous phenate-cobaltous carboxylate salt of wax-phenolic acid disulfide (3–16)
B3 = ½% stannous carboxylate salt of wax-phenolic acid disulfide (3–16)
B4 = ½% cobaltous carboxylate salt of wax-phenolic acid monosulfide (3–16)
B5 = ½% cobaltous phenate-cobaltous carboxylate salt of wax-phenolic acid monosulfide (3–16)
B6 = ½% stannous carboxylate of diamyl phenolic acid disulfide
B7 = ¼% stannous carboxylate salt of diamyl phenolic acid monosulfide

TABLE III

| Oil sample | Ring condition | | | | | | | | Grams carbon | N. N. |
|---|---|---|---|---|---|---|---|---|---|---|
| | Degrees stuck | | | | | Percent slots filled | | | | |
| | 1 | 2 | 3 | 4 | 5 | 3 | 4 | 5 | | |
| A1 | 360 | 360 | 360 | 360 | 360 | 60 | 75 | 60 | 13.9 | 1.3 |
| B1 | 0 | 0 | 0 | 0 | 0 | 0 | 0 | 0 | 3.15 | 0.6 |
| A2 | 0 | 0 | 360 | 360 | 360 | 90 | 70 | 90 | 13.4 | 1.5 |
| B2 | 0 | 0 | 0 | 0 | 0 | 0 | 0 | 0 | 4.2 | 0.3 |
| A3 | 360 | 360 | 360 | 360 | 360 | 70 | 90 | 50 | 13.3 | 1.8 |
| B3 | 0 | 0 | 0 | 0 | 0 | 0 | 0 | 0 | 3.5 | 0.8 |
| A4 | 240 | 90 | 360 | 360 | 0 | 25 | 20 | 5 | 10.5 | 1.9 |
| B4 | 0 | 0 | 0 | 0 | 0 | 0 | 0 | 0 | 4.9 | 0.3 |
| A5 | 120 | 0 | 240 | 0 | 0 | 35 | 0 | 20 | 8.9 | 1.2 |
| B5 | 0 | 0 | 0 | 0 | 0 | 0 | 0 | 0 | 5.5 | 0.2 |
| A6 | 90 | 180 | 360 | 360 | 360 | 90 | 80 | 90 | 17.3 | 1.3 |
| B6 | 120 | 0 | 0 | 0 | 0 | 0 | 0 | 0 | 4.4 | 1.2 |
| A7 | 360 | 0 | 360 | 360 | 180 | 80 | 90 | 80 | 14.5 | 1.9 |
| B7 | 360 | 0 | 0 | 0 | 0 | 30 | 5 | 5 | 7.6 | 1.6 |

The amount of improving agent used may be varied depending upon the mineral oil with which it is blended and the properties desired in the final oil composition. As aforesaid, the sulfide derivatives of alkylated hydroxyaromatic carboxylic acid salts of the type contemplated herein may be used in amounts ranging from $\frac{1}{16}$ per cent to 5 per cent, and in general compositions of the desired improved properties may be obtained with amounts in the neighborhood of ½ per cent.

It is to be understood that while I have described certain preferred procedures which may be followed in preparation of the sulfide condensation products contemplated herein as oil-improving agents and have referred to various representative constituents in these improving agents, such procedures and examples have been used for illustrative purposes only. The invention, therefore, is not to be considered as limited by the specific examples given but includes within its scope such changes and modifications as fairly come within the spirit of the appended claims.

I claim:

1. An improved mineral oil composition comprising a mineral oil having admixed therewith a minor proportion of an oil-miscible sulfide of a hydroxyaromatic carboxylic acid metal salt in which at least two aryl nuclei are interconnected by at least one atom of sulfur and in which part of the nuclear hydrogen is substituted with a predominantly aliphatic mineral oil-solubilizing substituent.

2. An improved mineral oil composition comprising a mineral oil having admixed therewith a minor proportion of an oil-miscible sulfide of an alkyl-substituted hydroxyaromatic carboxylic acid metal salt in which at least two substituted aryl nuclei are interconnected by at least one atom of sulfur.

3. An improved mineral oil composition comprising a mineral oil having admixed therewith a minor proportion of an oil-miscible monosulfide of an alkyl-substituted hydroxyaromatic carboxylic acid metal salt in which at least two substituted aryl nuclei are interconnected by an atom of sulfur.

4. An improved mineral oil composition comprising a mineral oil having admixed therewith a minor proportion of an oil-miscible polysulfide of an alkyl-substituted hydroxyaromatic carboxylic acid metal salt in which at least two substituted aryl nuceli are interconnected by at least two atoms of sulfur.

5. An improved mineral oil composition comprising a mineral oil having admixed therewith a minor proportion of an oil miscible condensation product of an alkyl substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with its equivalent weight of metal.

6. An improved mineral oil composition comprising a mineral oil having admixed therewith a minor proportion of an oil miscible condensation product of an alkyl substituted hydroxyaromatic carboxylic acid salt in which at least two substituted aryl nuclei are interconnected by at least one atom of an element selected from the group consisting of sulfur, selenium and tellurium and in which the carboxyl hydrogen and the hydroxyl hydrogen are substituted with metal.

7. An improved mineral oil composition comprising a mineral oil having admixed therewith a minor proportion of an oil miscible condensation product of an alkyl substituted hydroxyaromatic carboxylic acid salt in which at least two substituted aryl nuclei are interconnected by at least one atom of an element selected from the group consisting of sulfur, selenium and tellurium; the carboxyl hydrogen is substituted with metal and the alkyl substituent contains at least twenty carbon atoms.

8. An improved mineral oil composition comprising a mineral oil having admixed therewith a minor proportion of an oil miscible condensation product of a wax substituted hydroxyarmomatic carboxylic acid salt in which at least two wax substituted aryl nuclei are interconnected by at least one atom of an element selected from the group consisting of sulfur, selenium and tellurium and in which the carboxyl hydrogen is substituted with its equivalent weight of metal.

9. An improved mineral oil composition comprising a mineral oil having admixed therewith a minor proportion of an oil-miscible sulfide of an alkyl-substituted hydroxyphenol carboxylic acid metal salt in which at least two substituted phenyl nuclei are interconnected by at least one atom of sulfur.

10. An improved mineral oil composition comprising a mineral oil having admixed therewith a minor proportion of an oil-miscible sulfide of an alkyl-substituted hydroxy-naphthyl carboxylic acid metal salt in which at least two substituted naphthyl nuclei are interconnected by at least one atom of sulfur.

11. An improved mineral oil composition having admixed therewith a minor proportion of an oil-miscible sulfide of an alkyl-substituted hydroxyaromatic carboxylic acid metal salt in which at least two aryl nuclei are interconnected by at least one atom of sulfur and in which the metal content thereof is a metal selected from the group consisting of tin, aluminum, zinc, chromium, cobalt, nickel, and molybdenum.

12. An improved mineral oil composition comprising a mineral oil having admixed therewith a minor proportion of an oil miscible condensation product of a wax substituted hydroxyaromatic acid salt in which at least two wax substituted aryl nuclei are interconnected by at least one atom of sulfur and in which the carboxyl hydrogen is substituted with tin.

13. An improved mineral oil composition comprising a mineral oil having admixed therewith a minor proportion of an oil miscible condensation product of a wax substituted hydroxyaromatic carboxylic acid salt in which at least two wax substituted aryl nuclei are interconnected by at least one atom of sulfur and in which the carboxyl hydrogen and the hydroxyl hydrogen are substituted with tin.

14. An improved mineral oil composition comprising a mineral oil having admixed therewith a minor proportion of an oil-miscible sulfide of a wax-substituted hydroxyphenyl carboxylic acid salt in which at least two substituted phenyl nuclei are interconnected by at least one atom of sulfur and in which the carboxyl hydrogen is substituted with a metal selected from the group consisting of tin, aluminum, zinc, chromium, cobalt, nickel, and molybdenum.

15. An improved mineral oil composition comprising a mineral oil having admixed therewith a minor proportion of an oil-miscible sulfide of a wax-substituted hydroxyphenyl carboxylic acid salt in which at least two substituted phenyl nuclei are interconnected by at least one atom of sulfur and in which the carboxyl hydrogen and the hydroxyl hydrogen are substituted with a metal selected from the group consisting of tin, aluminum, zinc, chromium, cobalt, nickel, and molybdenum.

16. An improved mineral oil composition comprising a mineral oil having admixed therewith a minor proportion of an oil-miscible sulfide of an alkyl-substituted hydroxyaromatic carboxylic acid metal salt in which at least two substituted aryl nuclei are interconnected by at least one atom of sulfur and in which at least one nuclear hydrogen atom is substituted with a radical selected from the group consisting of: hydroxyl, ester, keto, alkoxy, aroxy, ether alcohol, aldehyde, oxime, amide, carbamide, aralkyl, aryl, alkaryl, halogen, nitroso, amino, nitrosamine, amidine, imine, N-thio, diazo, hydrazine, cyano, azoxy, azo, and hydrazo radicals.

17. An improved mineral oil composition comprising a mineral oil having admixed therewith a minor proportion of an oil-miscible sulfide of an alkyl-substituted hydroxyaromatic carboxylic acid metal salt of the type obtained by condensing a wax-substituted alkali metal phenate-alkali metal carboxylate salt of said acid with a halide of sulfur and reacting the product thus obtained at elevated temperature with an alcohol solution of an alcohol-soluble salt of a metal other than an alkali metal.

18. An improved mineral oil composition comprising a mineral oil having admixed therewith a minor proportion of an oil-miscible sulfide of a wax-substituted hydroxyaromatic carboxylic acid metal salt of the type obtained by condensing a wax-substituted alkali metal phenate-alkali metal carboxylate salt of said acid with sulfur monochloride and reacting the product thus obtained at elevated temperature with an alcohol solution of stannous chloride.

19. An improved mineral oil composition comprising a mineral oil having admixed therewith a minor proportion of a metalorganic condensation product characterized by having at least once therein the grouping corresponding to the general formula

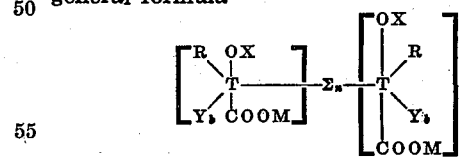

in which T represents an aromatic nucleus; R represents at least one oil-solubilizing alkyl group; Y represents additive hydrogen, residual nuclear hydrogen, or a radical selected from the group consisting of hydroxyl, ester, keto, alkoxy, aroxy, ether alcohol, aldehyde, oxime, amide, carbamide, aralkyl, aryl, alkaryl, halogen, nitroso, amino, nitrosamine, amidine, imine, N-thio, diazo, hydrazine, cyano, azoxy, azo, and hydrazo radicals; $b$ represents the number of Y substituents and is equal to zero or a whole number corresponding to the available hydrogens on the nucleus T not substituted with R, OX, COOM and $\Sigma_n$; X represents an element selected from the group consisting of hydrogen and metal; M represents the hydrogen equivalent of a metal; $\Sigma$ represents an element selected from the group consisting of sulfur, selenium, and tellurium; and $n$ represents a whole number from one to four.

20. An improved mineral oil composition comprising a mineral oil having admixed therewith a minor proportion of a metalorganic condensation product characterized by having at least once therein the grouping corresponding to the general formula

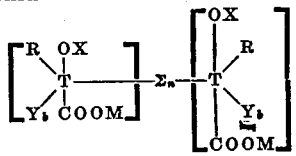

in which T represents an aromatic nucleus; R represents at least one alkyl group corresponding to an aliphatic hydrocarbon characterizing petroleum wax; Y represents additive hydrogen, residual nuclear hydrogen, or a radical selected from the group consisting of hydroxyl, ester, keto, alkoxy, aroxy, ether alcohol, aldehyde, oxime, amide, carbamide, aralkyl, aryl, alkaryl, halogen, nitroso, amino, nitrosamine, amidine, imine, N-thio, diazo, hydrazine, cyano, azoxy, azo, and hydrazo radicals; $b$ represents the number of Y substituents and is equal to zero or a whole number corresponding to the available hydrogens on the nucleus T not substituted with R, OX, COOM and $\Sigma_n$; X represents an element selected from the group consisting of hydrogen and metal; M represents the hydrogen equivalent of a metal; $\Sigma$ represents an element selected from the group consisting of sulfur, selenium, and tellurium; and $n$ represents a whole number from one to four.

21. An improved mineral oil composition comprising a mineral oil having admixed therewith from about $\frac{1}{10}$ per cent to about 5 per cent of an oil-miscible sulfide of an alkyl-substituted hydroxyaromatic acid metal salt in which at least two substituted aryl nuclei are interconnected by at least one atom of sulfur.

22. An improved mineral oil composition comprising a mineral oil having admixed therewith from about $\frac{1}{10}$ per cent to about 5 per cent of an oil-miscible sulfide of a wax-substituted hydroxyaromatic acid metal salt in which at least two aryl nuclei are interconnected by at least one atom of sulfur.

23. An improving agent for mineral oils and the like comprising a metalorganic condensation product characterized by having at least once therein the grouping corresponding to the general formula

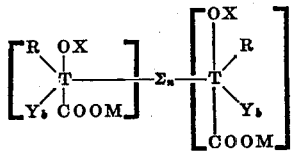

in which T represents an aromatic nucleus; R represents at least one oil-solubilizing alkyl group; Y represents additive hydrogen, nuclear residual hydrogen, or a radical selected from the group consisting of hydroxyl, ester, keto, alkoxy, aroxy, ether alcohol, aldehyde, oxime, amide, carbamide, aralkyl, aryl, alkaryl, halogen, nitroso, amino, nitrosamine, amidine, imine, N-thio, diazo, hydrazine, cyano, azoxy, azo, and hydrazo radicals; $b$ represents the number of Y substituents and is equal to zero or a whole number corresponding to the avilable hydrogens on the nucleus T not substituted with R, OX, COOM and $\Sigma_n$; X represents an element selected from the group consisting of hydrogen and metal; M represents the hydrogen equivalent of a metal; $\Sigma$ represents an element selected from the group consisting of sulfur, selenium, and tellurium; and $n$ represents a whole number from one to four.

24. An improving agent for mineral oils and the like comprising a metalorganic condensation product characterized by having at least once therein the grouping corresponding to the general formula

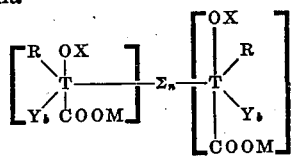

in which T represents an aromatic nucleus; R represents at least one alkyl group corresponding to an aliphatic hydrocarbon characterizing petroleum wax; Y represents additive hydrogen, nuclear residual hydrogen, or a radical selected from the group consisting of hydroxyl, ester, keto, alkoxy, aroxy, ether alcohol, aldehyde, oxime, amide, carbamide, aralkyl, aryl, alkaryl, halogen, nitroso, amino, nitrosamine, amidine, imine, N-thio, diazo, hydrazine, cyano, azoxy, azo, and hydrazo radicals; $b$ represents the number of Y substituents and is equal to zero or a whole number corresponding to the available hydrogens on the nucleus T not substituted with R, OX, COOM, and $\Sigma_n$; X represents an element selected from the group consisting of hydrogen and metal; M represents the hydrogen equivalent of a metal; $\Sigma$ represents an element selected from the group consisting of sulfur, selenium, and tellurium; and $n$ represents a whole number from one to four.

25. An improving agent for mineral oils comprising an oil miscible condensation product of an alkyl substituted hydroxyaromatic carboxylic acid salt in which at least two substituted aryl nuclei are interconnected by at least one atom of an element selected from the group consisting of sulfur, selenium and tellurium and in which the carboxyl hydrogen is substituted with metal.

26. An improving agent for mineral oils comprising an oil miscible condensation product of an alkyl substituted hydroxyaromatic carboxylic acid salt in which at least two substituted aryl nuclei are interconnected by at least one atom of an element selected from the group consisting of sulfur, selenium and tellurium and in which the carboxyl hydrogen and the hydroxyl hydrogen are substituted with metal.

27. An improving agent for mineral oils comprising an oil miscible condensation product of a wax substituted hydroxyaromatic carboxylic acid salt in which at least two wax substituted aryl nuclei are interconnected by at least one atom of an element selected from the group consisting of sulfur, selenium and tellurium and in which the carboxyl hydrogen is substituted with metal.

28. An improving agent for mineral oils comprising an oil miscible condensation product of a wax substituted hydroxyaromatic carboxylic acid salt in which at least two wax substituted aryl nuclei are interconnected by at least one atom of an element selected from the group consisting of sulfur, selenium and tellurium and in which the carboxyl hydrogen and the hydroxyl hydrogen are substituted with metal.

29. An improving agent for mineral oils and the like comprising an oil-miscible sulfur derivative of an alkyl-substituted hydroxyaromatic carboxylic acid metal salt of the type obtained by condensing an alkyl-substituted alkali metal phenate-alkali metal carboxylate salt of said acid with a halide of sulfur and reacting the product thus obtained with an alcohol solution of an alcohol-soluble salt of a metal other than alkali metal.

30. An improving agent for mineral oils and the like comprising an oil-miscible sulfur derivative of a wax-substituted hydroxyaromatic carboxylic acid metal salt of the type obtained by condensing a wax-substituted alkali metal phenate-alkali metal carboxylate salt of said acid with a halide of sulfur; reacting the product thus formed with an alcohol solution of an alcohol-soluble salt of a metal selected from the group consisting of tin, aluminum, zinc, chromium, cobalt, nickel, and molybdenum; and then washing the reaction product to remove the alkali metal salt formed in the last-mentioned reaction.

31. An improving agent for mineral oils comprising an oil miscible condensation product of an alkyl substituted hydroxyaromatic carboxylic acid salt in which at least two alkyl substituted aryl nuclei are interconnected by at least one atom of an element selected from the group consisting of sulfur, selenium and tellurium and in which the carboxyl hydrogen is substituted with a metal selected from the group consisting of tin, aluminum, zinc, chromium, cobalt, nickel and molybdenum.

32. An improving agent for mineral oils comprising an oil miscible condensation product of an alkyl substituted hydroxyaromatic carboxylic acid salt in which at least two alkyl substituted aryl nuclei are interconnected by at least one atom of an element selected from the group consisting of sulfur, selenium and tellurium and in which the carboxyl hydrogen and the hydroxyl hydrogen are substituted with a metal selected from the group consisting of tin, aluminum, zinc, chromium, cobalt, nickel and molybdenum.

33. An improving agent for mineral oils comprising an oil miscible condensation product of an alkyl substituted hydroxyaromatic carboxylic acid salt in which at least two alkyl substituted aryl nuclei are interconnected by at least one atom of sulfur and in which the carboxyl hydrogen is substituted with tin.

34. An improving agent for mineral oils comprising an oil miscible condensation product of an alkyl substituted hydroxyaromatic carboxylic acid salt in which at least two alkyl substituted aryl nuclei are interconnected by at least one atom of sulfur and in which the carboxyl hydrogen and the hydroxyl hydrogen are substituted with tin.

ORLAND M. REIFF.